United States Patent

[11] 3,572,564

| [72] | Inventor | Floyd L. Fleming<br>2110 Southwest 173rd Place, Seattle, Wash. 98166 |
|---|---|---|
| [21] | Appl. No. | 769,926 |
| [22] | Filed | Oct. 23, 1968 |
| [45] | Patented | Mar. 30, 1971 |

[54] GLASS BOTTLE AND JUG CUTTER
5 Claims, 8 Drawing Figs.

[52] U.S. Cl................................................ 225/2,
30/164.95, 225/96, 225/103
[51] Int. Cl................................................ B26f 3/00
[50] Field of Search........................................ 225/2, 96,
103; 30/164.9, 164.95; 81/3; 241/99

[56] References Cited
UNITED STATES PATENTS

| 999,668 | 8/1911 | Montaperto.............. | 30/164.95X |
| 2,209,701 | 7/1940 | McGann.................... | 30/164.95X |
| 2,612,001 | 9/1952 | Denlinger.................. | 225/2 |
| 2,674,066 | 4/1954 | Pederson.................... | 30/164.95 |
| 3,169,683 | 2/1965 | Pierce........................ | 225/103X |
| 3,318,500 | 5/1967 | Swanson..................... | 225/2 |
| 3,406,886 | 10/1968 | Wesel et al. ............... | 225/2 |

*Primary Examiner*—Frank T. Yost
*Attorney*—Seed, Berry and Dowrey

ABSTRACT: Apparatus for severing closed glass articles such as bottles and tubes employing a jig to hold a glass cutter wheel at the proper angle relative to the glass and to guide the cutter in scribing a shallow groove on the outside of a bottle. A hammer is inserted through the mouth of the bottle for tapping the glass opposite the groove on the outside of the bottle. The hammer has a stop engageable with the mouth of the bottle enabling it to be manipulated outside the bottle held fixed relative to the groove while tapping along the groove.

Patented March 30, 1971
3,572,564
2 Sheets-Sheet 1
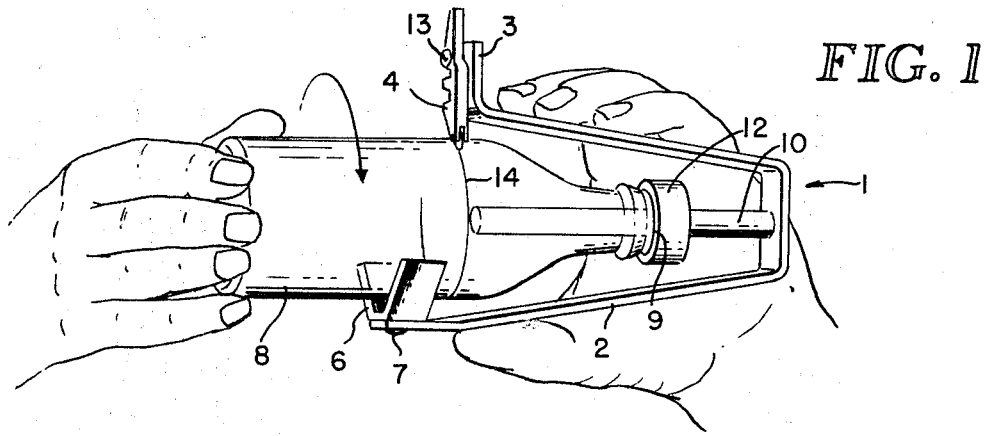
FIG. 1
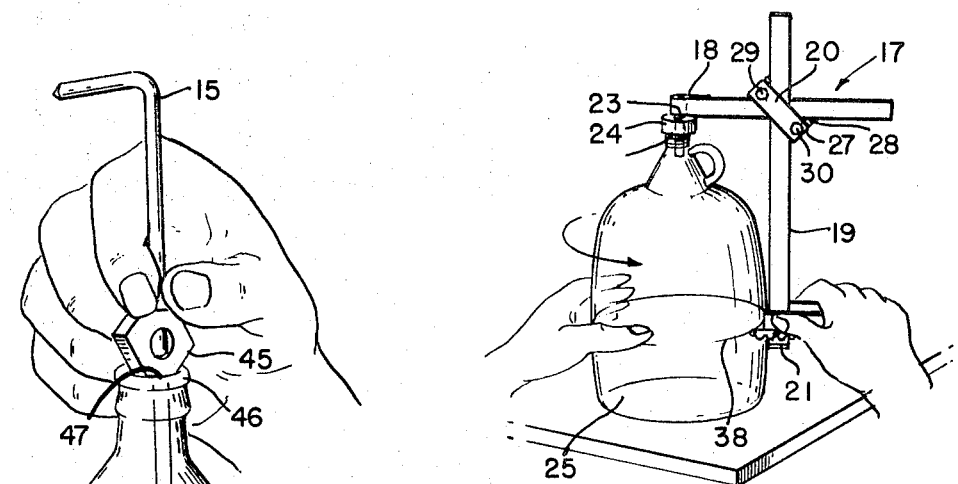
FIG. 2
FIG. 3
FLOYD L. FLEMING
INVENTOR.
BY 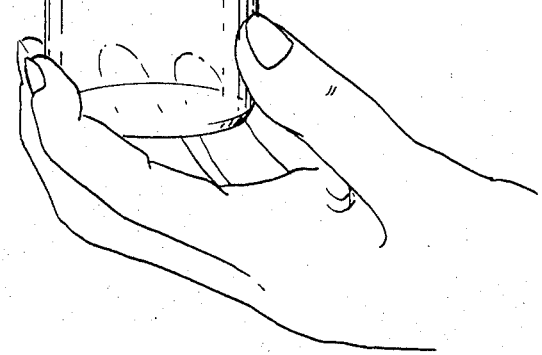
ATTORNEYS

FLOYD L. FLEMING
INVENTOR.

BY Seed, Berry & Dowrey

ATTORNEYS

GLASS BOTTLE AND JUG CUTTER

BACKGROUND OF THE INVENTION

This invention relates to methods and apparatus for cutting glass. Specifically the present invention relates to methods and apparatus for severing closed glass articles such as bottles.

Standard glass-cutting apparatus includes a glass cutter wheel and a hammer. The glass cutter scribes a shallow groove into the surface of the glass and the hammer completes the cutting operation when tapped along the cut line on the other side of the glass. The glass fractures at the cut line as it is tapped by the hammer severing the glass into two pieces. Obtaining a clean fracture requires skill and patience even when severing plane glass. The cutter wheel inscribing the cut line must be held generally perpendicular to the glass and the tapping or hammering on the glass must be directed principally to the cut line. Tapping too hard, tapping above or below the cut line, scribing too deep a cut with the cutter and/or failing to keep the angle of attack of the cutter wheel on a straight heading can all lead to an irregular fracture of the glass. An uneven severance of the glass is often accompanied by glass splinters which present a danger to the artist or technician.

The glass-cutting operation is more difficult when attempting to sever closed glass articles such as ordinary beverage bottles or glass tubes. Closed glass articles present the additional problem of nonplanar surfaces. Beverage bottles such as commonly used for soda and beer have circular cross sections of varying diameter on which it is difficult to scribe a cut line. Furthermore, because the mouth or spout of the bottles are small it has been extremely difficult to hammer precisely along the cut line on the inside of the bottle.

Accordingly, it is an object of the present invention to sever closed glass articles using improved methods and apparatus for scribing a proper cut line on the outside of bottles and tapping along the cut line on the inside of the bottle. These objects are accomplished by employing a jig for a glass cutter adapted to insert into the mouth of a bottle pivotable thereabout. The jig includes means for adjusting the distance of the glass cutter from the mouth of the bottle and the angle of the cutter to the bottle. An object of the present invention is to scribe a controlled cut line on a bottle. A novel design permits insertion of a hammer into the bottle through the mouth. The hammer includes a generally V-shaped rubber stop slidably adjusted on the hammer handle permitting the hammer head to be aligned precisely opposite the cut line on the outside of the bottle. The V-stop enables the hammer to be held under pressure against the mouth of the bottle to stabilize its vertical position inside the bottle while allowing an operator to swing the hammer back and forth using the portion of the handle outside the bottle. Another object of the present invention is therefore to devise a simple yet effective means for tapping the inside walls of a closed glass article at a precise position within the article.

DESCRIPTION OF THE DRAWINGS

Other objects and features of the present invention will be apparent from a further reading of the description of the invention along with the drawings which are:

FIG. 1 illustrates a first embodiment of a jig coupled to a bottle enabling an operator to scribe a cut line with a glass cutter supported by the jig;

FIG. 2 illustrates a second embodiment of a jig coupled to a jug enabling an operator to scribe a line on a jug;

FIG. 3 illustrates a hammer inserted into a bottle for tapping along a cut line;

DESCRIPTION OF THE INVENTION

Figure 4:
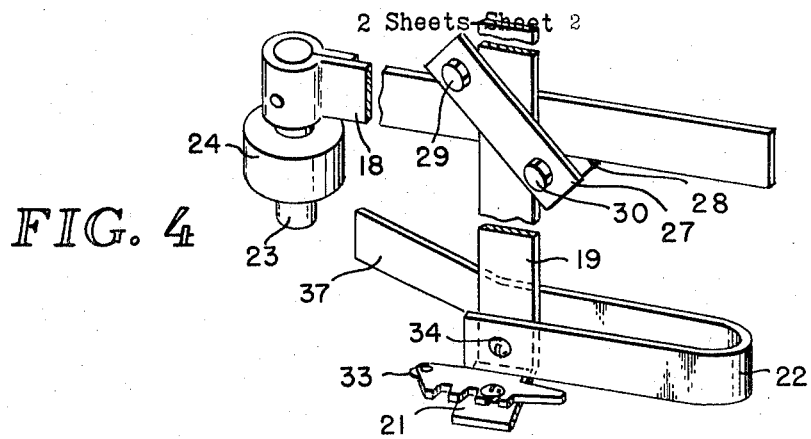
FIG. 4 is an enlarged view of the jig in FIG. 2 illustrating the manner in which a glass cutter is attached thereto.

The present invention includes jig means and hammer means. The jig means is used to hold a glass cutter at a fixed angle and position relative to the mouth of a bottle (or other closed article) for scribing a cut line about at least a portion of the periphery of the bottle. The hammer means is apparatus for tapping on the inside of a bottle directly opposite the cut line scribed on the outside. The hammer means includes a stop for engagement with the mouth of the bottle aligning the hammer head opposite the cut line and providing a pivot about which the hammer is manipulated to obtain the necessary hammering or tapping action.

Referring to FIG. 1, jig 1 includes the U-shaped frame 2 having platform 3 formed by bending an end of the U-shaped frame. The platform is used for supporting glass cutter 4. Cradle 6 attached at the other end of the U-shaped frame 2 by screw 7 enables the jig to slidably abut bottle 8. Jig 1 engages with bottle 8 at mouth 9. Wood dowel 10 is appropriately attached to the U-shaped frame at the bottom of the U. Slidably mounted on the dowel is an adjustable rubber stop 12.

Figure 5:
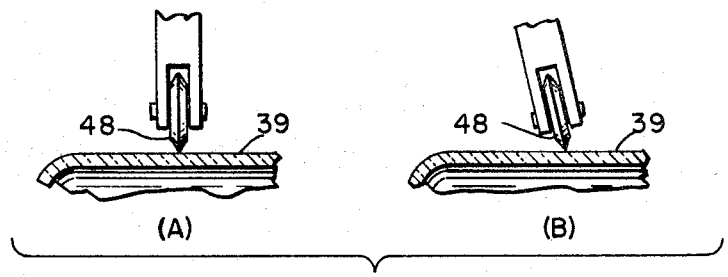
FIGS. 5a and 5a illustrate the correct and incorrect angles respectively at which a glass cutter should be held for obtaining a proper cut line.
Figure 6:
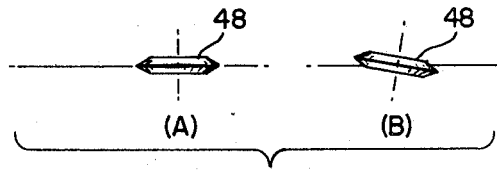
FIGS. 6(a) and 6(b) are plan views of a cutter wheel illustrating the correct and incorrect angles of attack, respectively.

Adjustable rubber stop 12 is slid to different positions on dowel 10 so as to position glass cutter 4 at a specific location on the surface of the bottle 8. Glass cutter 4 is attached to platform 3 by set screw 13. The angle of the glass cutter relative to the surface of the bottle is substantially perpendicular as illustrated in FIG. 5a. This angle is illustrated in FIGS. 5a and 5b and is controlled by varying the bend defining platform 3. The angle of attack of the glass cutter illustrated in FIG. 6b is adjusted by pivoting the glass cutter about set screw 13, by inserting a shim between the cutter and platform and by twisting the platform.

The angle of attack of the cutter refers to the angle between the direction of movement of cutter wheel 11 and a plane through the periphery of wheel 11. The angle of attack should be zero as indicated in FIG. 6a The frame 2 is preferably constructed from an aluminum alloy to enable the platform to be bent and twisted relatively easily with pliers or another tool while remaining rigid when scribing a cut line. One-eighth inch thick, three-quarter inch wide aluminum bar stock has proven to be satisfactory material for frame 2.

Once the glass cutter 4 is aligned perpendicular to the surface of the bottle at a desired distance from the mouth (established by the position of the rubber stop 12 on dowel 10), the U-shaped frame is gripped between the thumb and forefingers as illustrated in FIG. 1 to hold the glass cutter under pressure against the bottle. The bottle is then rotated as indicated in FIG. 1 to obtain cut line 14 around the periphery of the bottle. After cut line 14 is scribed, jig 1 is removed from the bottle and hammer 15 inserted for tapping opposite the cut line 14 to sever the bottle. This operation is explained following the description of jig 17 in FIG. 2.

Jig 17 is designed principally for use with larger bottles or jugs such as that illustrated in FIG. 2. Jig 17 is formed from an arm 18, leg 19, hinge 20, platform 21 and handle 22. Dowel 23 and adjustable rubber stop 24 similar to those of jig 1 are mounted at the end of arm 18. The dowel and rubber stop partially adjust the position of platform 21 below mouth 24. Dowel 23 and stop 24 also provide a pivot enabling jig 17 to traverse the periphery of the jug along a control line. The principal means for adjusting the distance of platform 21 below mouth 26 is hinge 20. Hinge 20 comprises plates 27 and 28 and thumb screws 29 and 30. Plate 27 has two unthreaded holes 31 for accommodating the thumb screws 29 and 30. Plate 28 has threaded holes 32 which enable the threaded thumb screws to compress arm 18 and leg 19 between the plates. The arm and leg are tied or hinged together by the pressure exerted by the plates.

The arm, leg and plates are ⅛-inch aluminum bar stock three-quarters inch wide enabling the arm and leg to pivot relative to each other. The arm and leg abut the thumb screws when pivoted to generally 90° forming a rigid joint. The thumb screws are loosened to slide the arm and leg relative to each other. This enables jig 17 to be adapted to different size jugs. The hinge 20 is moved along arm 18 to accommodate the diameter of a jug and moved along leg 19 to position platform 21 over a desired location on jug 25. The thumb screws are tightened to lock the arm and leg.

Hinge 20 is orientated to be an acute angle pointing downward from the mouth of jug 25. In this position, the hinge prevents the arm and leg from pivoting as the leg is forced downward while the arm is engaged with mouth 26. The arm and leg therefore maintain platform 21 at a fixed distance from mouth 26 as jig 17 is pivoted about dowel 23.

Glass cutter 33 is mounted on platform 21 by set screws 13 as with jig 1. The proper orientation of cutter 33 to the jig is established as with jig 1 by pivoting the cutter about the set screw and twisting and bending platform 21. In addition, hinge 20 is adjusted along arm 18 to effect the orientation of FIG. 5a and the loop in handle 22 is compressed or expanded to effect the orientation of FIG. 6a.

Handle 22 is connected to leg 19 by screw 34 readily enabling the entire jig assembly to be disassembled for ease of shipment. The handle includes guide 37 which abuts the surface of a jig being cut enabling the operator to more efficiently apply pressure between his left and right hands. The cut line is scribed in the jug by gripping the jig and jug as shown in FIG. 2, exerting the correct pressure between glass cutter 33 on jug 25 and rotating the jug. This operation is clearly illustrated in FIG. 2.

Turning now to FIG. 3, hammer 15 is shown inserted into bottle 39. Cut line 38 is scribed on the bottle using the jig of FIG. 1 or FIG. 2. The hammer is conveniently formed from a metal rod 42 bent at least at one end forming hammer head 43. Hammer head 43 has a sharp point 44. Point 44 is aligned precisely opposite cut line 38 by positioning adjustable rubber stop 45 at a desired position on rod 42. The stop is V-shaped to be wedged into the mouth of a bottle and rocked back and forth to obtain the tapping operation. Stop 45 is rubber and remains substantially at a fixed position on the rod when attempted to be slid along rod 42. A simultaneous twisting and pulling motion is necessary to move the rubber stopper on the rod.

The hammer is tapped against the inside of a bottle as illustrated in FIG. 3. The portion of rod 42 extending above stop 45 is moved back and forth swinging hammer head 44 back and forth against the inside wall of bottle 39. The V-shape of the stopper enables the operator to bear down on rod 42 to keep point 44 at a constant elevation as it is swung back and forth. The point 44 is aligned opposite cut line 38 and moved along the cut line to complete the severing of the bottle started by the cut line. The V-shape of stop 45 permits the operator to turn the hammer in the mouth of the bottle in order to advance around the periphery of the bottle. The bend of hammer head 43 is changed to a different angle to accommodate the shape of a particular bottle.

Hammer 15 is made longer or shorter merely by using a longer rod 42. Obviously, both ends of the rod can be bent to form a hammer head. In such case stop 45 is given a V-shape at both its ends. Other types of stops can be devised to permit the hammer to be swung back and forth while held at a fixed position within a bottle. An example is a metal bracket slidable on rod 42 having a cross arm to prevent the rod 42 from falling into the bottle and a set screw to lock the cross arm to a desired position on the rod. It is preferable however to use stop 45 because it is readily moved along the rod by the twisting pulling motion for adjustment of the hammer position in the bottle yet resists movement during the hammering operation. In addition, stop 45 is easily manufactured. Stop 45 is made by boring a hole through a rubber gromet slightly smaller than the diameter of rod 42 then shaving the gromet to give the V-configuration.

Glass cutters 4 and 33 are standard hand-held glass cutters with the handle removed. The set screw 13 fits a groove 49 in the standard cutter to attach it to a jig.

The component parts of the jig and hammering apparatus of the present invention are readily assembled and disassembled for ease of manufacture and shipment. Since the components are so readily separated, the cutter and hammer may be used for cutting plane sheets of glass. The principal advantage however is the accomplishment of the more difficult task of severing a bottle. The present glass severing apparatus and method makes possible a clean severance of a closed glass article and may easily be adapted to automatic machine operation.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

I claim:

1. A method for severing closed glass articles comprising:
    inserting a jig having a stopper means into the open end of the article;
    scribing a cut line on the outside of the article with a glass cutter held in said jig; and
    tapping on the inside of the article opposite said cut line with a hammer inserted through an open end of the article said hammer having a stop for engaging the open end of the article preventing further insertion but permitting tapping, the tapping severing the article along the cut line.

2. The method of claim 1 wherein said tapping step includes the steps of forcing said hammer stop against the open end of the article through which it is inserted, moving the portion of the hammer outside the article back and forth to tap the inside of the article and advancing the hammer along the cut line.

3. The method of claim 1 wherein said scribing step includes compressing said jig against the article and rotating said jig about the article around the point of pivotable engagement with the article.

4. Apparatus for severing closed glass articles comprising:
    stopper means for cooperation with the open portion of the article;
    adjustable means pivotally mounted to said stopper means outside of said article and extending laterally thereof;
    adjustable means hingedly mounted to said laterally extending means and glass cutter means attached to said hingedly mounted means whereby the stopper means may be placed in the open portion of the article, the apparatus adjusted for diameter of the article and the length of the portion to be severed and then the cutter placed in contact with the article and relative rotation begun, scoring the article, which can then be severed by impact from within the article.

5. An apparatus as in claim 4 wherein the glass cutter is angularly adjustable.